Figure 1:
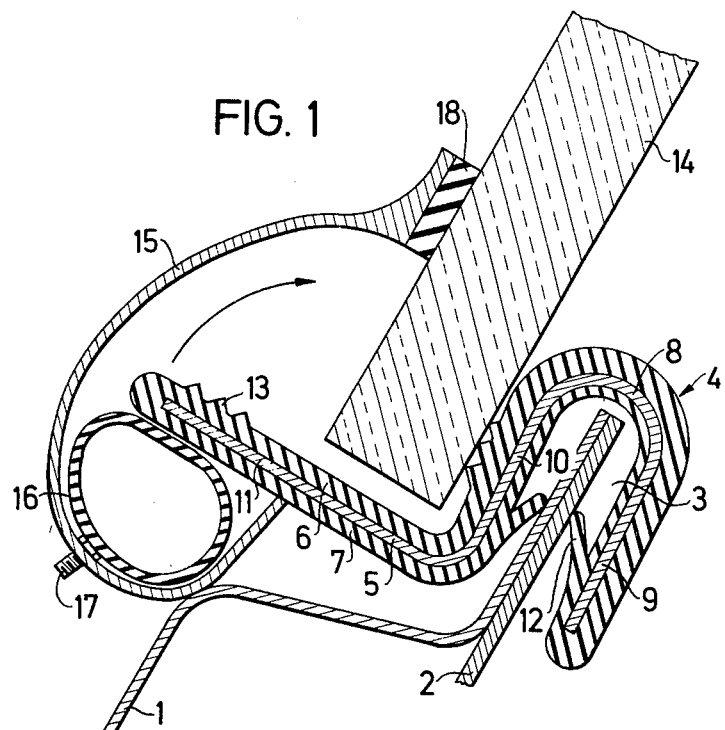

United States Patent [19]
Soderberg

[11] 4,007,536
[45] Feb. 15, 1977

[54] METHOD OF USING A SEALING STRIP TO MOUNT A GLASS PANEL IN A SHEET METAL BODY

[76] Inventor: Gosta Soderberg, Karl Johansgatan 47 H, Goteborg, Sweden

[22] Filed: June 27, 1975

[21] Appl. No.: 591,018

Related U.S. Application Data

[62] Division of Ser. No. 445,091, Feb. 25, 1974, abandoned.

[30] Foreign Application Priority Data

Feb. 28, 1973 Germany .......................... 2309921

[52] U.S. Cl. .............................. 29/421 R; 29/511; 49/491; 52/400; 52/627; 52/717
[51] Int. Cl.² .......................................... B23P 17/00
[58] Field of Search ........... 29/511, 421 R; 49/491; 52/400, 717, 627

[56] References Cited

UNITED STATES PATENTS

| | | | |
|---|---|---|---|
| 2,225,758 | 12/1940 | Stein | 29/511 X |
| 2,278,025 | 3/1942 | Sadoski | 29/511 UX |
| 2,610,713 | 9/1952 | Bradley | 52/717 X |
| 2,610,714 | 9/1952 | Bradley | 52/400 |
| 3,002,269 | 10/1961 | Hopkins | 29/421 UX |
| 3,034,146 | 5/1962 | Lyon | 29/511 X |

Primary Examiner—Charlie T. Moon
Attorney, Agent, or Firm—Hans Berman

[57] ABSTRACT

The glass panel of a windshield is installed in an opening of the sheet metal car body by first placing on the edge of the sheet metal about the opening an elongated sealing strip of hook-shaped cross section and laminar structure, a core layer of metal being enveloped between two surface layers of elastomeric material. The sheet metal edge is received in the groove of a channel portion of the sealing strip, and a plate portion projects at right angles from the channel portion forward and outward of the opening, thereby permitting the glass panel to be placed in abutting engagement with the channel portion. The part of the plate portion projecting forward beyond the glass panel is enveloped in a loop-shaped rubber tube and folded over on the glass panel by inflating the tube. The folded-over strip firmly holds the glass panel under the pressure of the metal core.

3 Claims, 2 Drawing Figures

METHOD OF USING A SEALING STRIP TO MOUNT A GLASS PANEL IN A SHEET METAL BODY

This is a division of application Ser. No. 445,091, filed Feb. 25, 1974, now abandoned.

This invention relates to the installation of a glass panel in a window frame of sheet material, and particularly to a sealing strip and to its use in installing a glass panel.

While glass panels are installed in sheet metal frames in many applications, and this invention is applicable to all such applications, it will be described hereinafter with reference to the installation of a windshield in the body of an automotive vehicle, such as a passenger car, a truck, an airplane, or a motorboat.

It is common practice to install glass panels in the window opening of a sheet metal frame by means of a sealing or weather strip of elastomeric material having a fence groove in which the body fence or edge of the frame is received and a glass groove receiving the edge of the glass panel. The installation of the panel in the window opening by means of conventional weather strips requires much manual labor and the use of hand tools, and is quite costly for this reason. The object of the invention is the provision of a sealing strip which permits a windshield to be installed with a minimum of labor and with the use of mechanical equipment.

With this object and others in view, as will hereinafter become apparent, the invention provides a laminar, elongated sealing strip comprising a core layer of sheet metal having two longitudinal edges and two opposite, major faces connecting the edges. First and second layers of elastomeric material are superimposed on the major faces of the core layer respectively and project laterally beyond the edges of the latter. The projecting portions of the elastomeric layers are integrally connected so that the two layers form a unitary body in which the core layer is completely embedded except for the longitudinal ends of the sealing strip.

The strip as a whole and each of its layers are of uniform, hook-shaped cross section over the length thereof and constitute an approximately U-shaped channel portion and a plate portion angularly joined to the channel portion.

When a glass panel is to be installed in a window opening of a body of sheet metal, the afore-described sealing strip is placed on the body in a position in which the edge portion of the sheet metal body, which bounds the window opening, is received in the channel portion, and the plate portion projects from the channel portion in the direction in which the opening passes through the sheet metal body. The glass panel is moved in this direction along the plate portion until the panel abuts against the channel portion and a part of the plate portion projects away from the channel portion beyond the panel. The projecting part of the plate portion may then be folded inward of the opening on the panel to secure the same in or over the window opening.

Figure 2:
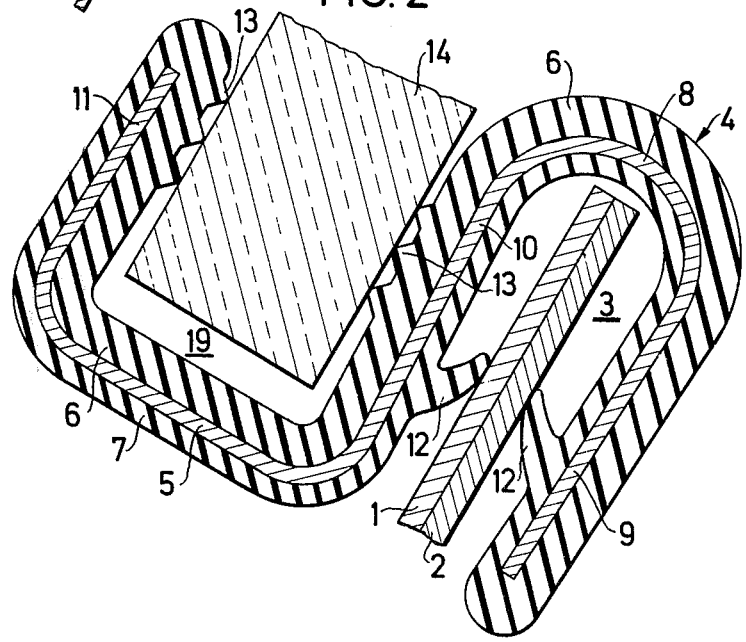

Other features, additional objects, and many of the attendant advantages of this invention will readily be appreciated as the same becomes better understood by reference to the following detailed description of a preferred embodiment when considered in connection with the appended drawing in which:

FIG. 1 shows elements of a motorcar body and apparatus for installing a windshield on the body in fragmentary elevational section; and FIG. 2 shows elements of the apparatus of FIG. 1 in plan section after installation of the windshield.

Referring now to the drawing in detail, and initially to FIG. 1, there is shown the lower edge portion 1 of a car body, not otherwise illustrated, about a front windshield opening. The free edge of the car body is reinforced by a welded sheet 2 of reinforcing metal to form a body fence of sheet metal which extends in a closed loop about the entire window opening in a manner conventional and not explicitly shown.

The fence is received in a fence groove 3 of a sealing strip or weather strip 4. The strip has a core layer 5 of spring steel, typically 0.5 mm thick, and two surface layers 6, 7 of synthetic rubber or other suitable elastomeric material which are superimposed on and preferably vulcanized to respective, opposite major faces of the core layer 5. Respective parts of each of the two surface layers extend laterally of the sealing strip beyond the two longitudinal edges of the core layer 5 a distance smaller than the thickness of the strip 4 between the exposed surfaces of the layers 6, 7 which are parallel to the major faces of the core layer 5.

The layers 5, 6, 7 and the sealing strip 4 as a whole are of hook-shaped cross section and are elongated transversely to the plane of FIG. 1, the strip being long enough to extend about the loop of the body fence, and the two ends of the strip being connected by a butt joint or in any other conventional manner, not shown. Each layer, and the strip as a whole, has a channel portion bounding the fence groove 3, the channel portion being approximately U-shaped in the cross sectional plane of FIG. 1.

The core layer 5 thus has a channel portion constituted by a web 8 and two flanges 9, 10 which converge slightly in a direction away from the web 8 on opposite sides of the fence groove 3. The web has a concave inner face directed toward the groove 3 and a convex outer face. The flange 9 terminates in one of the longitudinal edges of the core layer 5. The portion of the flange 10 farthest from the web 8 is joined at right angles to a plate portion 11 of the core layer 5 which is substantially flat.

The surface layer 6 which covers the convex face of the web 8 is of greater thickness than the surface layer 7, as is better seen in FIG. 2. The two surface layers and the strip as a whole have webs, flanges, and plate portions as described with reference to the core layer 5. Lips 12 project from the flanges of the thinner surface layer 7 obliquely toward the web 8 and sealingly engage the body fence 1, 2. The width of the fence groove 3 between the flanges of the surface layer 7 has been exaggerated in FIG. 1 for greater clarity of pictorial representation. The groove is actually so narrow that the body fence is tightly clamped between the flanges of the layer 7 under the pressure exerted by the channel portion of the core layer 5.

The thicker surface layer 6 carries groups of integral, longitudinal ribs 13 on the flange joined to the plate portion of the layer, and on the plate portion. In the condition of the apparatus illustrated in FIG. 1, a major face of a windshield 14 of safety glass abuttingly engages the ribs 13 on the channel portion of the layer 6, and the narrow edge of the windshield is closely adjacent and parallel to the exposed surface of the layer 6 in the plate portion of the latter.

A hollow metal frame 15 of approximately J-shaped cross section is placed over the edge portion 1 of the car body and bridges the gap between the car body and the windshield 14. The bight at one end of the J-shape encloses a rubber tube 16 provided with a check valve 17 of the type conventional on tire tubes, the valve being fixedly secured in the wall of the frame 15 and accessible outside the frame. The free other end of the J-shape carries a resilient pad 18 which rests on the front or outer surface of the windshield 14.

As not explicitly shown, the frame 15, the tube 16, and the pad 18 extend in a closed loop about the entire window opening, and the frame is releasably strapped to the A-post of the car body in a manner obvious and not illustrated. The surface layer 7 of the sealing strip abuts against the free edge of the bight portion of the frame 15 and against the tube 16. When the tube 16 is inflated by means of compressed air admitted through the valve 17, the plate portion of the sealing strip 4 is folded over an edge of the windshield 14 until the ribs 13 on the plate portion are compressed in sealing engagement between the exposed surface of the layer 6 and the front surface of the windshield 14, and the plate portion of the sealing strip 4 encloses a glass channel 19, the resulting configuration of the strip 4 being seen in FIG. 2.

The part of the plate portion 11 of the core layer 5 and the corresponding parts of the surface layers 6, 7 frame the window opening in the intermediate condition illustrated in FIG. 1. When the tube 16 is inflated, the projecting parts are folded on the windshield 14 simultaneously over the entire length of the sealing strip 4, and the relationship of the windshield 14, the body fence 1, 2, and the sealing strip 4 is the same about the entire circumference of the window opening, the portion illustrated in FIG. 2 being near an A-post of the car body, not itself shown. As set forth above with reference to FIG. 1, the widths of the grooves 3, 19 are exaggerated in FIG. 2 for convenient pictorial representation.

In assembly line operation, the windshield 14 may be moved into the position shown in FIG. 1 by a hoist suspended from an overhead trolley while temporarily secured to the hoist by means of suction cups in a conventional manner to save even the labor of manually moving the windowpane along the plate part of the sealing strip until it abuts against the channel part, but manual insertion of the windshield will normally be more practical when it is intended to replace the damaged windshield of an individual car. The frame 15 thereafter is positioned as shown in FIG. 1.

The installed windshield 14 is securely held under the pressure exerted by the folded core 5, yet it is cushioned against injury by shock in the heavy rubber thickness of the surface layer 6. A firmer grip is exerted by the metallic core layer 5 on the body fence 1, 2 through the thinner rubber layer 7.

Compressed air is most convenient for inflating the tube 16, but stronger bending action may be achieved by using a liquid for expanding or inflating the tube 16. When the insertion is completed, the tube 16 is deflated, the frame 15 is released from the A-posts of the car body and transferred to the next car body in which a windshield is to be installed.

The sealing strip 4, of course, may be used in conjunction with a suitably shaped frame 15 for installing the rear window of a motor vehicle, and other applications will readily suggest themselves. The utility of the strip and of the installation method for permanently sealed windows in buildings, and for installing glass panels in metal frames hingedly movable in a building is obvious.

It should be understood, therefore, that the foregoing disclosure relates only to a preferred embodiment of the invention, and that it is intended to cover all changes and modifications of the example of the invention chosen herein for the purpose of the disclosure which do not depart from the spirit and scope of the invention set forth in the appended claims.

What is claimed is:

1. A method of installing a glass panel in a window opening extending through a body of sheet metal in a predetermined direction, said body having an edge portion bounding said opening, said method comprising:
    a. placing a laminar, elongated sealing strip on said body,
        1. said sealing strip including a core layer of sheet metal having two longitudinal edges and two opposite major faces connecting said edges, and first and second surface layers of elastomeric material respectively superimposed on said major faces and projecting laterally beyond said edges, the projecting portions of said first and second layers being integrally connected, whereby said core layer is enveloped by said elastomeric material, said strip and each of said layers thereof being of uniform, hook-shaped cross section over the length thereof and constituting an approximately U-shaped channel portion and a plate portion angularly joined to said channel portion,
        2. said sealing strip being placed on said body in a position in which said edge portion is received in said channel portion, and said plate portion projects from said channel portion in said direction;
    b. moving said panel in said direction along said plate portion until said panel abuts against said channel portion and a part of said panel portion projects away from said channel portion beyond said panel; and
    c. folding the projecting part of said plate portion inward of said opening on said panel.

2. A method as set forth in claim 1, wherein said edge portion extends about said opening in a closed loop, substantially the entire length of said loop being received in said channel portion after said placing of said sealing strip in said position, whereby said plate portion frames said opening, said projecting part of said plate portion being folded on said panel simultaneously over said substantially entire length.

3. A method as set forth in claim 2, wherein said projecting part is folded on said panel by placing an expandable, tubular member about said projecting part outside said opening, and thereafter inflating said tubular member.

* * * * *